Feb. 1, 1966 J. A. MEHR 3,232,649
ADJUSTABLE SWIVEL MECHANISM
Filed Sept. 23, 1963 2 Sheets-Sheet 1

INVENTOR
JACOB A. MEHR
BY *Cohn and Powell*
ATTORNEYS

Feb. 1, 1966 J. A. MEHR 3,232,649
ADJUSTABLE SWIVEL MECHANISM
Filed Sept. 23, 1963 2 Sheets-Sheet 2
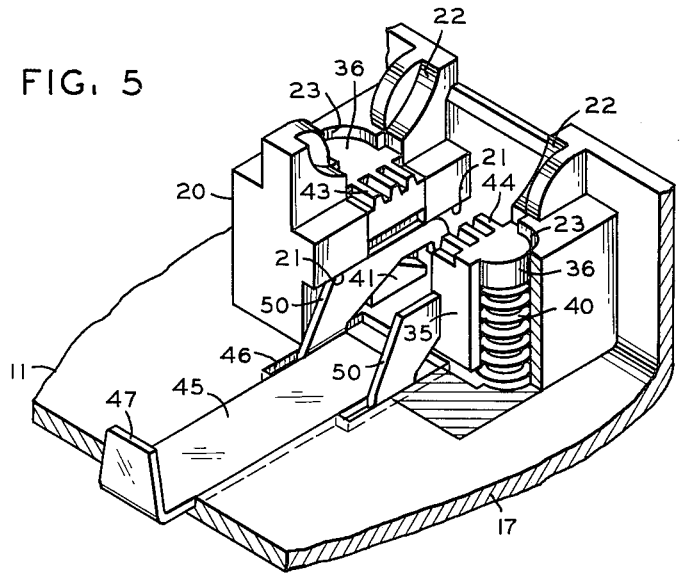
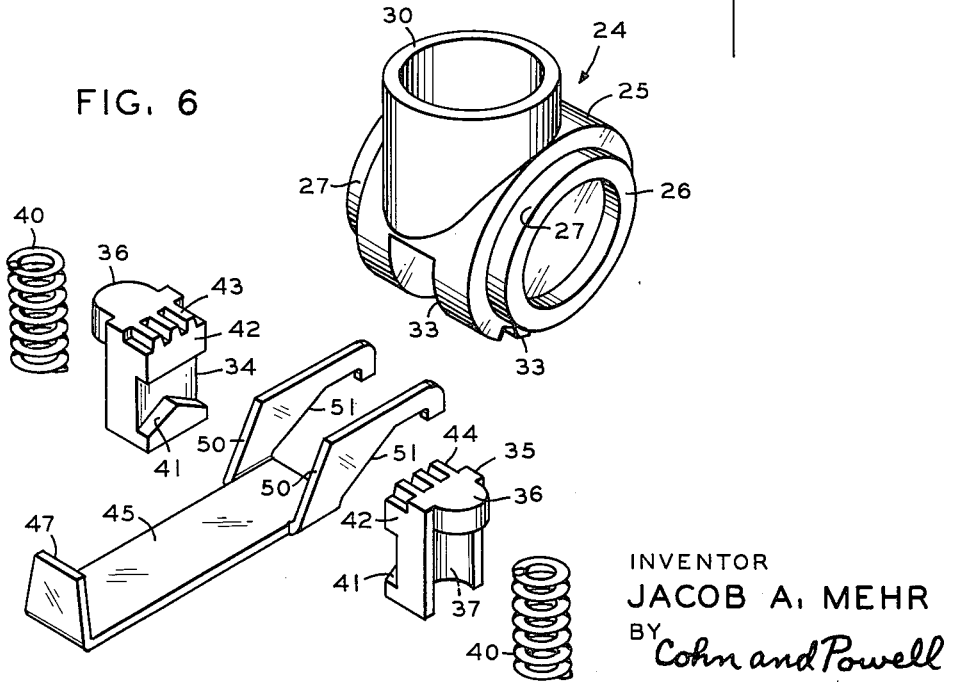
INVENTOR
JACOB A. MEHR
BY *Cohn and Powell*
ATTORNEYS

United States Patent Office 3,232,649
Patented Feb. 1, 1966

3,232,649
ADJUSTABLE SWIVEL MECHANISM
Jacob A. Mehr, Kirkwood, Mo., assignor to Dazor Manufacturing Corp., St. Louis, Mo., a corporation of Delaware
Filed Sept. 23, 1963, Ser. No. 310,733
3 Claims. (Cl. 287—14)

This invention relates generally to improvements in an adjustable swivel mechanism, and more particularly to improvements for selectively latching or unlatching a swivel incident to adjusting the angular position of such swivel.

It is an important objective to realize a swivel mechanism that can be advantageously utilized in a wide variety of items for mounting a swinging arm, as for example, in a lamp in which the arm can be conveniently adjusted to locate the light at a desired position.

An important object is provided by a locking means that is selectively engageable with a rotatively mounted swivel to retain the swivel in any of a plurality of angular positions, and an actuating means that operates to move the locking means into or out of effective latching engagement with the swivel.

Another important object is achieved by the structural arrangement of the locking means relative to the mounting base and swivel which guides the locking means in its movement toward and away from the swivel, assures positive latching engagement with the swivel, maintains assembly of the component parts, and provides a stable rotative mounting for the swivel.

Still another important object is afforded by the provision of a follower on the locking element and of a cam on the actuating arm engageable with the follower so as to urge the locking element selectively toward or away from the swivel incident to causing respectively engagement or disengagement of the teeth interconnecting the locking element and swivel. Upon operative engagement, the swivel is retained in a predetermined position, and upon operative disengagement the swivel is released for adjustment on its angular position.

An important object is realized by separate sets of teeth on the swivel, each set being adapted to coact with a separate and independent locking element. The teeth of one set of swivel teeth are angularly displaced relative to the other set so that the teeth of one locking element are aligned and engaged while the teeth of the other locking element are misaligned and disengaged, thereby obtaining greater accuracy and selection in the angular position of the swivel.

Another important object is achieved by the provision of a pair of laterally spaced brackets that rotatively mount the swivel, a pair of locking elements disposed adjacent and inside of such brackets, and an actuating arm between the locking elements and operatively connected therewith to hold the locking elements in assembly with the brackets and to actuate the locking elements incident to positioning the swivel.

Yet another important object is afforded by the structural arrangement of cooperating grooves in the mounting brackets and each associated locking element which are adapted to receive a compression coil spring, the spring holding the locking element in assembly with the bracket, tending to urge the locking element toward and into engagement with the swivel, and guiding the locking element in its latching and unlatching action.

An important objective is provided by the specific structural connection of the locking elements with the actuating arm and with the swivel, so that effective actuation and latching of the locking elements is achieved.

It is an important object to provide an adjustable swivel mechanism that is simple and durable in construction, economical to manufacture and assemble, highly efficient in operation, and which can be readily manipulated by any one with only a minimum of instruction.

The foregoing and numerous other objects and advantages of the invention will more clearly appear from the following detailed description of a preferred embodiment, particularly when considered in connection with the accompanying drawings, in which:

FIG. 5 is a perspective view of the unit of FIG. 1 with the housing partially cut away to show the internal swivel mechanism, and FIG. 6 is an exploded view illustrating the movable parts of the swivel mechanism.

Figure 1:
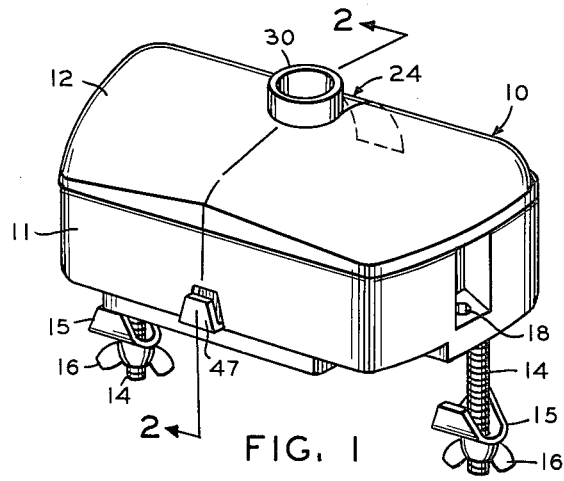
FIG. 1 is a perspective view of an adjustable swivel mechanism enclosed in its housing.
Figure 3:
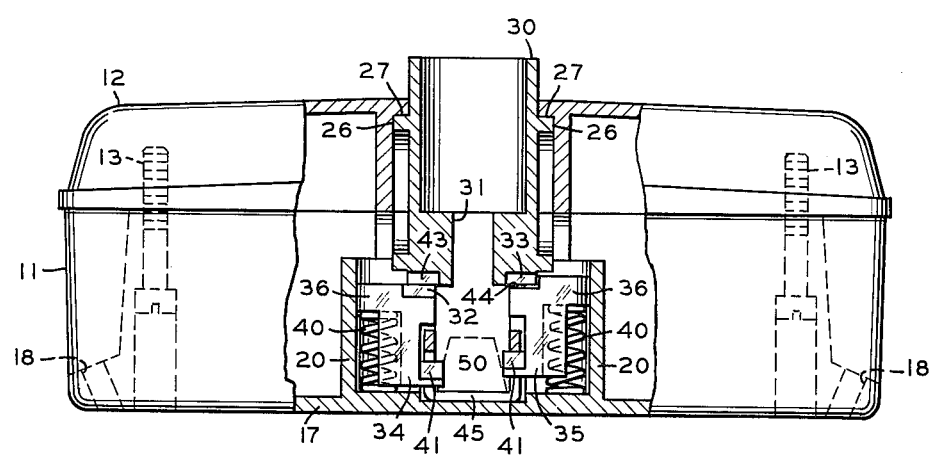
FIG. 3 is a cross sectional view as seen along staggered line 3—3 of FIG. 2.

Referring now by characters of reference to the drawings, and first to FIG. 1, it will be noted that the base unit generally indicated at 10 includes a housing that consists of a bottom section 11 and a separable top section 12. A plurality of screws 13, shown best in FIG. 3, hold the bottom and top sections 11 and 12 together.

Because the base unit 10 is utilized as a component part of a lamp or the like, it is advantageous to provide a fastening means for anchoring the base unit 10 securely to a supporting structure such as a table or desk. This fastening means includes a pair of screws 14 detachably connected to and depending from opposite ends of the bottom housing 11. A clamp 15 is slidably mounted on each of the screws 14, the clamp 15 being adapted to engage the underside of a supporting surface. Threadedly attached to each screw 14 is a wing nut 16 that is adapted to adjust the position of the clamp 15 axially along screw 14 incident to clamping the base unit securely on the supporting surface. At times, an alternative mounting means is used. For example, the base unit 10 can be screwed directly to the suitable surface. Under these circumstances, the screws 14 are removed, and the base unit 10 is fixed in place by passing screws (not shown) through the coacting screw mountings 18 located at each end of the unit 10.

The lower housing section 11 includes a bottom wall 17. Extending upwardly from the bottom wall 17 are a pair of laterally spaced brackets 20 arranged in substantially parallel relation as is best seen in FIG. 5. Each bracket 20 includes an inturned upper ledge 21. The ledges 21 extend toward and face each other. Formed in the top side of each ledge 21 is an arcuate bearing surface 22. As will be explained, the underside of the ledge 21 forms a bearing surface also.

Each of the brackets 20 is provided with a vertical groove 23 extending from the bottom wall 17 to and through the associated ledge 21. The bracket grooves 23 are arranged in opposed, facing relation. While only one of the bracket grooves 23 is illustrated in FIG. 6, it will be apparent that the opposite bracket 20 is provided with a similar groove. The purpose and function of the bracket grooves 23 will be apparent upon later description of parts.

The swivel generally indicated at 24 includes a substantially cylindrical body 25 having reduced end portions 26. Each of the reduced end portions 26 is provided with a peripheral bearing surface 27.

In assembly, the swivel 24 extends between the base brackets 20 with the end bearing surfaces 27 seated in the arcuate bearing surfaces 22. It will be noted that the relatively enlarged intermediate portion of body 25 extends downwardly beside the bracket ledges 21.

Secured to the intermediate portion of swivel body 25 is a tubular arm 30. Another arm (not shown) such as a supporting lamp arm can be conveniently and easily attached to the tubular swivel arm 30. The angular position of the lamp arm can be adjusted by turning the swivel 24 about its rotative axis. As suggested in FIG. 2, the swivel 24 can be moved from a position in which the tubular arm 30 is in its fully upright position as shown in full lines to a position in which the tubular arm 30 is in its horizontal position as indicated in broken lines.

The intermediate portion of swivel body 25 is provided with a slot 31 in its bottom side which communicates with the interior of tubular arm 30. Because the base unit 10 is advantageously utilized with a lamp, a cord or fixture wire (not shown) can be extended upwardly through the swivel slot 31, through the tubular arm 30, and hence through the lamp arm for connection to a socket.

Figure 4:
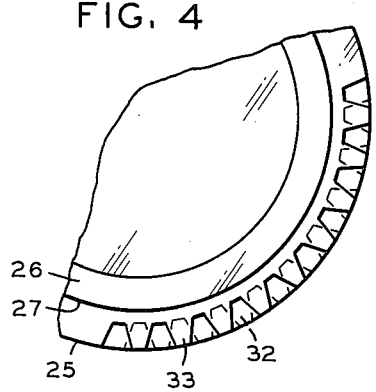
FIG. 4 is a fragmentary side elevational view illustrating the angular displacement of the two sets of swivel teeth.

The swivel body 25 is provided with two sets of angularly spaced peripheral teeth 32 and 33, one set of teeth 32 being located closely adjacent one reduced end 26 and closely adjacent one of the bracket ledges 21, while the other set of teeth 33 is located closely adjacent the opposite swivel end 26 and adjacent the other bracket ledge 21. For reasons which will appear, the set of teeth 32 are angularly displaced relative to the other set of teeth 33, as is clearly shown in FIG. 4.

A pair of locking elements 34 and 35 are disposed between the brackets 20. More particularly, each of the locking elements 34 and 35 is located closely adjacent one of the brackets 20 underneath the associated overhanging ledge 21. The locking elements 34 and 35 are identical in construction.

For example, each of the locking elements 34 and 35 includes a rearwardly projecting top shoulder 36 that is adapted to interfit slidably the associated bracket groove 23. Moreover, the rear side of each locking element 34 and 35 is provided with a vertical groove 37 that is aligned with an associated bracket groove 23.

A compression coil spring 40 is located in the aligned locking element groove 37 and bracket groove 23, one end of the spring 40 engaging the shoulder 36 and tending to urge the associated locking element in a direction toward the swivel 24. The interconnection of the spring 40 with both locking element and bracket 20 resulting from the placement in the aligned grooves 37 and 23, and the interconnection of the shoulder 36 in the bracket groove 23, guides the locking element in its movement toward or away from the swivel, and tends to hold the locking element in assembly with the associated bracket 20.

Each of the locking elements 34 and 35 is provided with an inwardly projecting follower 41. As is shown in FIG. 7, the follower 41 is constructed in a symmetrical triangular shape in order that the locking elements can be used interchangably on either the left or right hand side of the swivel unit.

Spaced above the follower 41, each of the locking elements 34 and 35 is provided with a projection 42. The projection 42 of locking element 34 is provided with teeth 43 adapted to mesh with the set of swivel teeth 32 when the locking element 34 is raised in its operative position into engagement with the swivel body 25 and when the swivel 24 is angularly located to align the coacting teeth 43 and 32. The projection 42 of the other locking element 35 is provided with teeth 44 that are adapted to engage and mesh with the other set of swivel teeth 33 when such locking element 35 is moved upwardly toward the swivel 24, and when the swivel 24 is turned to align these teeth.

The actuating means includes an arm 45 slidably mounted in a compatible groove 46 formed in the upper surface of the bottom wall 17 of the lower housing section 11. The outer end of arm 45 is provided with an upturned tab 47 that extends outwardly of the housing section 11. The tab 47 can be easily gripped to move the arm 45 reciprocatively in its groove 46 incident to actuating the locking elements 34 and 35.

The opposite end of arm 45 is provided with a pair of laterally spaced hooks 50 that fit between the locking elements 34 and 35 and fit over the followers 41. It will be noted that the hooks 50 abut the inside of the locking elements 34 and 35 and hold such locking elements against the brackets 20, and hence hold the locking elements in assembly. Each of the hooks 50 is provided with a cam 51 adapted to engage one of the followers 41 of the locking element 34 and 35.

It is thought that the operation and functional results of the swivel mechanism have become fully apparent of the foregoing detailed description of parts, but for completeness of disclosure the latching and unlatching action will be briefly described.

Figure 2:
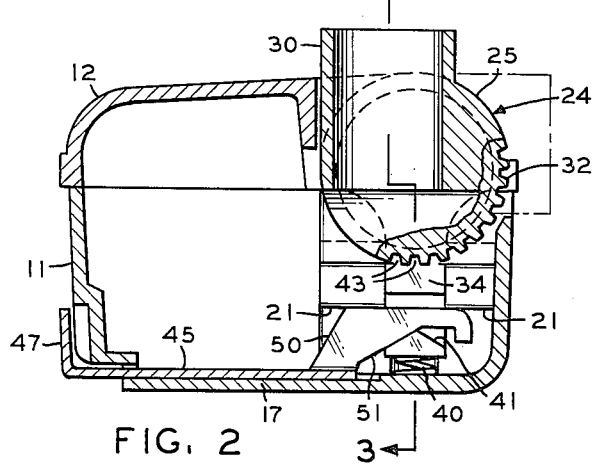
FIG. 2 is a cross sectional view as seen along line 2—2 of FIG. 1.

It will be assumed that all of the parts are assembled as explained previously and as shown in the drawings, and that the swivel 24 is angularly disposed with the tubular arm 30 in a vertical position as is shown in full lines in FIG. 2. In this position, the locking element teeth 43 operatively engaged the set of swivel teeth 32 to latch the swivel 24 in a predetermined angular position. However, the locking element teeth 44, while abutting the swivel body 25, do not mesh with the other set of swivel teeth 33 in view of the relative angular displacement of these sets of swivel teeth. To raise the locking elements 34 and 35 to their uppermost limit to provide latching of the swivel 24, the actuating arm 45 is moved outwardly to the position shown in FIG. 2, which allows the followers 41 to ride up on the cams 51 under the resilient loading of springs 40.

If it is desired to adjust the angular position of swivel 24 to another predetermined location, as is necessary in changing the position of a light carried by the tubular arm 30, the actuating arm 45 is pushed inwardly by a force exerted on tab 47. The movement of arm 45 is guided by the channel 46 in bottom wall 17. As the arm 45 is moved inwardly, the cams 51 formed on the hooks 50 slidably engage the followers 41 and urge the locking elements 34 and 35 downwardly in a direction away from the swivel 24. When the locking elements 34 and 35 move downwardly, the teeth 43 of the locking element 34 operatively disengages from the set of swivel teeth 32. Of course, it will be understood that the locking elements 34 and 35 move downwardly against the compressive loading of springs 40. The swivel 24 is now released for turning movement.

The swivel 24 is then turned to the desired angular position, as for example turned 90 degrees so that the tubular member 30 assumes the horizontal position shown by broken lines in FIG. 2. Then, the actuating arm 45 is pulled outwardly by a force exerted on tab 47. As the actuating arm 45 moves outwardly, the followers 41 of both locking elements 34 and 35 ride upwardly along the cams 51 under the loading of springs 40. The teeth 43 or 44 or one of the locking elements 34 or 35 respectively will be aligned with one of the sets of swivel teeth, either 32 or 33. When turned a full 90 degrees, the teeth 43 of locking element 34 will again be aligned with the set of swivel teeth 32. If the adjustment of swivel 24 was slightly less than 90 degrees it would be possible for teeth 44 of locking element 35 to be aligned operatively with the set of swivel teeth 33. The aligned teeth 43–32 or 44–33 will mesh and latch the swivel 24 in the adjusted angular position.

The top housing section 12 is provided with an opening 52 through which the intermediate swivel body 25 and the tubular member 30 extend. The contour of the top housing section 12 is rounded to conform with the cylindrical periphery of the swivel 24 to provide a continuous even surface. The peripheral margin of the opening 52 rides on the bearing surfaces 27 at each swivel end 26 in order to provide a secure mounting.

Although the invention has been described by making details reference to a single preferred embodiment, such detail is to be understood in an instructive, rather than in any restrictive sense, many variants being possible within the scope of the claims hereinto appended.

I claim as my invention:
1. An adjustable swivel mechanism comprising:
   (a) a base including laterally spaced brackets,
   (b) a swivel extending between the brackets and rotatively supported on the brackets,
   (c) the swivel being provided with separate sets of angularly spaced peripheral teeth, one set of teeth being displaced angularly relative to the other set,
   (d) a pair of locking elements, each locking element being provided with teeth engageable with one set of swivel teeth,
   (e) means guiding the locking elements toward or away from the swivel incident to latching and unlatching, and
   (f) actuating means connected to the locking elements tending to move the locking elements into or out of effective latching engagement with the swivel,
   (g) the teeth of one locking element operatively engaging one set of swivel teeth while the teeth of the other locking element are operatively disengaged because of the relative angular displacement of the two sets of swivel teeth.
2. An adjustable swivel mechanism comprising:
   (a) a base including laterally spaced brackets,
   (b) a swivel extending between said brackets and rotatively supported on said brackets, said swivel being provided with separate sets of angularly spaced peripheral teeth located inside of said brackets, one set of teeth being displaced angularly relative to the other set,
   (c) a pair of locking elements disposed between said brackets, one of said locking elements being located closely adjacent each bracket, each locking element being provided with teeth adapted to engage one set of swivel teeth,
   (d) guide means interconnecting the locking elements with the brackets for movement of the locking elements toward or away from said swivel, and
   (e) actuating means between said locking elements tending to move the locking elements into or out of effective latching engagement with said swivel, the teeth of one locking element operatively engaging one set of swivel teeth while the teeth of the other locking element is operatively disengaged because of the relative angular displacement of the two sets of swivel teeth.
3. An adjustable swivel mechanism comprising:
   (a) a base including a pair of laterally spaced brackets, said brackets having relatively in-turned ledges, said ledges being provided with arcuate bearing surfaces,
   (b) a swivel extending between said brackets, said swivel having reduced ends rotatively mounted on said bearing surfaces, said swivel being provided with two sets of angularly spaced peripheral teeth, one set being located adjacent each of the reduced ends and located between said brackets.
   (c) a pair of locking elements disposed between said brackets, one of said locking elements being located closely adjacent each bracket below its ledge, each locking element being provided with teeth adapted to engage one set of swivel teeth,
   (d) resilient means tending to urge said locking elements into locking engagement with said swivel,
   (e) the two sets of swivel teeth being relatively displaced angularly so that the teeth of one locking element operatively engages one set of swivel teeth while the teeth of the other locking element are operatively disengaged from the other set of swivel teeth,
   (f) means interconnecting each locking element with its associated bracket and guiding said locking element in its movement toward or away from said swivel, and
   (g) actuating means between said locking elements selectively camming said locking elements out of latching engagement to release said swivel for angular adjustment.

References Cited by the Examiner
UNITED STATES PATENTS

| | | | |
|---|---|---|---|
| 772,293 | 10/1904 | Reese | 287—99 |
| 1,538,477 | 5/1925 | Epstein | 248—185 |
| 1,580,358 | 4/1926 | Wright | 248—185 |
| 2,739,778 | 3/1956 | Krone | 285—184 X |
| 2,790,617 | 4/1957 | Harland | 248—183 |
| 2,812,961 | 11/1957 | Brown | 287—99 X |

CARL W. TOMLIN, *Primary Examiner.*

THOMAS F. CALLAGHAN, *Examiner.*